No. 883,976. PATENTED APR. 7, 1908.
F. C. SCHWEDTMAN.
SASH WEIGHT.
APPLICATION FILED JAN. 7, 1907.

Witnesses
Edgar J. Farmer.
A. J. McCauley.

Inventor:
Ferdinand C. Schwedtman
by Bakewell Cornwall
Atty's.

UNITED STATES PATENT OFFICE.

FERDINAND C. SCHWEDTMAN, OF ST. LOUIS, MISSOURI.

SASH-WEIGHT.

No. 883,976.	Specification of Letters Patent.	Patented April 7, 1908.

Application filed January 7, 1907. Serial No. 351,164.

*To all whom it may concern:*

Be it known that I, FERDINAND C. SCHWEDTMAN, a citizen of the United States, residing at St. Louis, Missouri, have invented certain new and useful Improvements in Sash-Weights, of which the following is a full, clear, and exact description, such as will enable others skilled in the art to which it appertains to make and use the same, reference being had to the accompanying drawings, forming part of this specification.

This invention relates to a new and useful improvement in sash weights, the object being to make the weight of a composition material instead of refined iron, which is usually employed. This material possesses the advantage of cheapness over refined iron; namely, iron which has been reduced or separated from the ore, in addition to which it does not have to be melted or poured into molds, which practice prevails with respect to cast iron weights.

Figure 1:
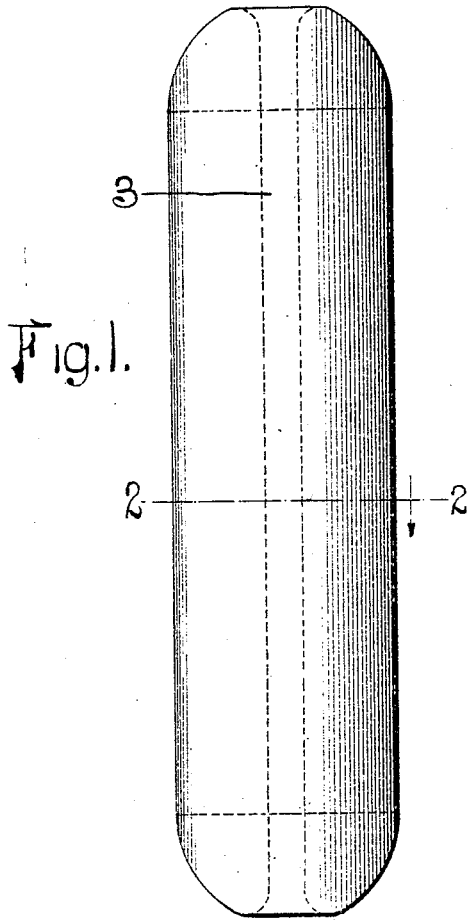
Figure 2:
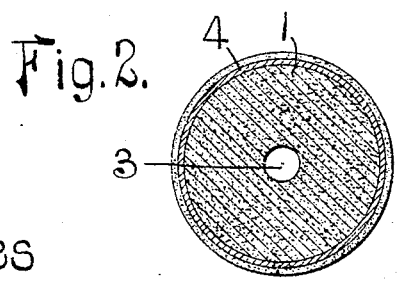

Figure 1 is a side elevational view of my improved sash weight; and Fig. 2 is a cross sectional view on the line 2—2 of Fig. 1.

In the drawings 1 indicates the body of the weight formed of my improved composition material, which weight may be formed with an opening 3 through which the sash cord may be passed and knotted at its lower end.

The material of which the weight is composed may be iron ore or other heavy granular material the cost price of which is less than that of cast iron, but I prefer to use barytes on account of its cheapness as compared to iron ore and its high specific gravity. Barytes is a heavy mineral essentially white in color, but for my purposes I can use the discolored cast-off products not available for the refined uses to which pulverized white barytes is employed, such, for instance as paint or pigment.

The barytes which I use in my improved weight is disintegrated or reduced to granular form, I having found that it is not necessary to carry this reduction to a point where the material will be pulverulent. To one pound of granular barytes I add about one ounce of liquid glass (silicate of soda), mixing well the two ingredients together, and then mold or press the mass into the desired shape. If the opening 3 is to be provided in the weight, the core is arranged in position in the mold, and after the mass is shaped said core is removed. The composition quickly sets, making a solid, hard mass, but slightly lighter than an equal bulk of cast iron. As liquid glass is insoluble in cold water and possesses a high fusing point, it will be obvious that said ingredient in possessing these properties is highly desirable as a binder for this purpose, in addition to which it is cheaply produced. I have found in practice that when the composition is mixed it very quickly sets, and therefore after the mixture is made it should be molded or pressed into shape without unnecessary delay.

Should it be desired to make the liquid glass insoluble in hot water, a small proportion of alum may be added to the composition while it is in the liquid state; or another method, and one which I prefer to use, is that of dipping the composition into alum water. Of course if it is desired to have an impervious coating of liquid glass on the surface of the composition, the composition may be dipped in liquid glass and afterwards dipped in alum in order to make it insoluble. After the weight is formed, in order to impart a smooth exterior, I prefer to wrap the same in a paper shell 4. With regard to this, however, it might be found desirable to mold the composition in the paper cylinder 4 in which event the liquid glass would act as an adhesive substance to hold the paper in position, and thus save the necessity of applying such a substance where the paper is wrapped around the formed mass.

To impart a finish to the article, I prefer to dip the same in tar, paint or varnish such as asphaltum varnish, which serves to fill the pores of the composition material and prevent disintegration which might otherwise result from blows or rubbing contact with rough surfaces. This coating of tar, paint or varnish is preferably of such character as to provide a flexible integument.

I am aware that sash weights have heretofore been made of cast iron and that it has been proposed to make sash weights of cement and furnace slag. In view of the fact, however, that the channels for standard cast iron sash weights are usually of given dimensions, to wit, two and one-half inches by two and one-half inches, it will be obvious that the only available method of complying with these usual conditions is to increase the length, maintaining the cross sectional area within the limits prescribed.

The following comparative table will illustrate the cheapness of my improved weight over cast iron, and the advantages of my improved weight over weights made of material other than cast iron:

|  | Weight per cubic inch. | Length of 10 lb. weight 2 in. sq. | Material cost per ton. | Labor cost per ton. | Total cost per ton. |
|---|---|---|---|---|---|
| Cast iron | .25 lbs. | 10 in. | $12 & coke $2 | $7.00 | $21.00 |
| Ground & pressed barytes | .136 " | 18½ " | $2.50 | 3.00 | 5.50 |
| Furnace slag | .093 " | 26⅔ " |  |  |  |
| Cement | .093 " | 26⅔ " | $8.00 | 3.00 | 11.00 |
| Brick | .054 " |  |  |  |  |

From the above table it will be seen that the material and labor cost of my improved barytes weights is so small that the finished weights could be sold at one-half the material and labor cost of producing cast iron weights and a profit obtained.

There is no special disadvantage on account of the length of my improved weight compared with the length of a ten-pound cast iron weight, because in most windows the channels extend throughout the height of the upper and lower sashes and consequently the extra length of the weight up to certain limits is not objectionable. However, when the sash weight exceeds the length of the standard iron weight over two and one-half times, it will at once be appreciated why cement, furnace slag and other lighter materials have not been used to any appreciable extent.

While it is true that my improved barytes weight is longer and not as strong as the ordinary cast iron weight, it is, on the other hand, not too long to be used practically, and it is sufficiently strong to stand the necessary handling. There is little strain on the sash weight after it is once in position, and the safety factor of barytes weights after they are in place is only about nine hundred to one. My improved barytes weight is as strong as the cement and stronger than a weight made of furnace slag.

Having thus described the invention, what is claimed as new and desired to be secured by Letters Patent is:

1. The herein described sash weight, the same being composed of granular material held together by a suitable binder and surrounded by a fibrous band; substantially as described.

2. As an article of manufacture, a sash weight composed of granular material of great specific gravity, held together by a binder and molded into the form of an elongated body, and a layer of fibrous material surrounding said body and provided with a coating of tar, paint or some similar substance which will preserve said fibrous material and impart a finished appearance to the weight; substantially as described.

3. As a new article of manufacture, a sash weight composed of small particles of barytes held together by a binder of silicate of soda and molded into the form of an elongated body provided at approximately its center with a longitudinally extending opening, and a flexible covering surrounding said elongated body; substantially as described.

In testimony whereof I hereunto affix my signature in the presence of two witnesses, this third day of January 1907.

FERDINAND C. SCHWEDTMAN.

Witnesses:
LENORE WILSON,
GEORGE BAKEWELL.